July 28, 1931.  C. G. EISENBERG, JR  1,816,042
LOAD EQUALIZING TRUCK BODY
Filed Dec. 3, 1928
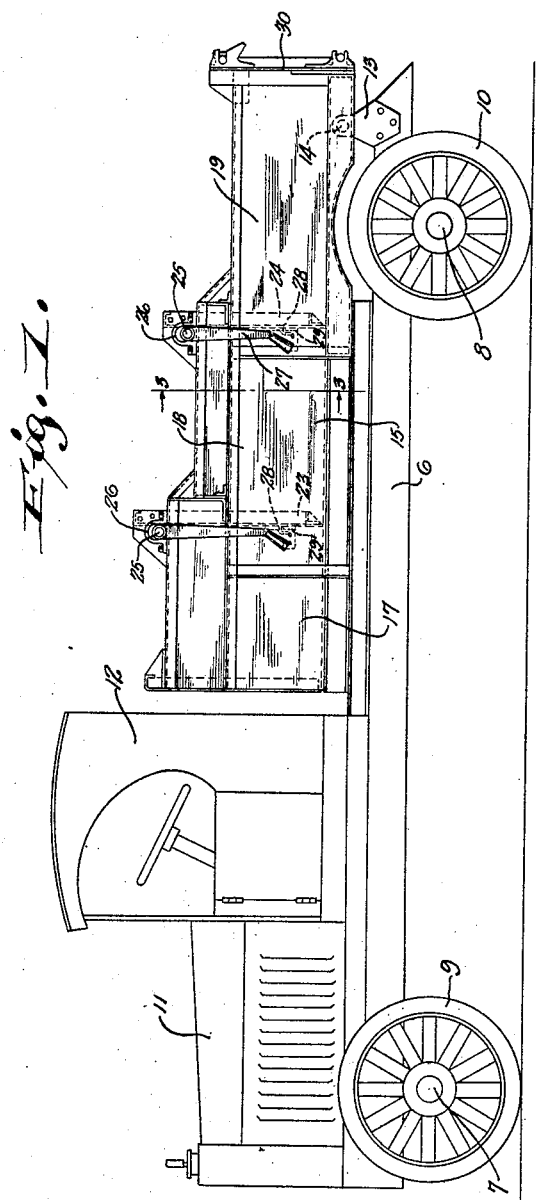
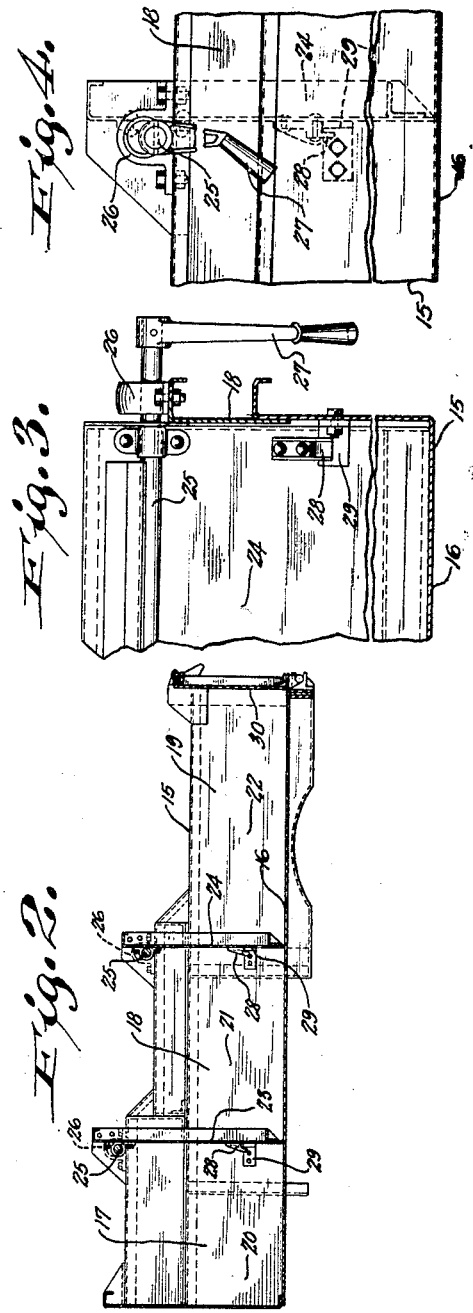
INVENTOR.
Charles G. Eisenberg Jr.
BY
Morsell, Keeney & Morsell
ATTORNEYS Patented July 28, 1931

1,816,042

UNITED STATES PATENT OFFICE

CHARLES G. EISENBERG, JR., OF MILWAUKEE, WISCONSIN, ASSIGNOR TO THE HEIL CO., OF MILWAUKEE, WISCONSIN, A CORPORATION OF WISCONSIN

LOAD EQUALIZING TRUCK BODY

Application filed December 3, 1928. Serial No. 323,348.

This invention relates to improvements in load equalizing truck bodies.

The ordinary truck body is of a uniform height throughout its entire length, and with the disposition of the body behind the engine and truck cab, when the body is loaded, the greater part of its weight is borne by the rear wheels of the vehicle. This uneven distribution of the weight upon the rear wheels tends to cause the vehicle to rut or damage roads over which it is traveling. Consequently, many States have passed laws limiting the proportion of the weight of a load which may be borne by the rear wheels of a motor vehicle.

It is, therefore, the primary object of the present invention to overcome the aforementioned objections by providing a truck body so proportioned and arranged that a greater portion of the load than heretofore must be disposed more forwardly within the truck body, thereby minimizing the weight borne by the rear wheels of the vehicle.

A further object of the invention is to provide a truck body divided into a plurality of compartments of equal capacities but of different proportions.

A further object of the invention is to provide a truck body which is forwardly stepped as to height.

A further object of the invention is to provide a load equalizing truck body which is of very simple construction, is strong and durable, and is well adapted for the purposes described.

With the above and other objects in view the invention consists of the improved load equalizing truck body, and its parts and combinations as set forth in the claims, and all equivalents thereof.

In the accompanying drawings in which the same reference characters indicate the same parts in all of the views:

Fig. 1 is a side view of a truck equipped with the improved load equalizing body;

Fig. 2 is a longitudinal sectional view of the truck body;

Fig. 3 is an enlarged fragmentary detail view, partly in section, of a body compartment with the end movable partition therefor and the means for operating the same; and Fig. 4 is an enlarged fragmentary side view of the same.

Referring now more particularly to the drawings, it will appear that the numeral 6 indicates a motor truck chassis mounted above a front axle 7 and a rear axle 8, the front axle carrying the usual steering wheels 9 and the rear axle carrying the usual driving wheels 10. The vehicle engine is mounted on the front end portion of the chassis and is covered with a hood 11 while the driver's seat or cab 12 is carried by the chassis rearwardly of the hood.

The rear end portion of the chassis carries a pair of opposed brackets 13 in which the end portions of a transverse pivot rod 14 are journaled, and the rear end portion of the truck body, indicated generally by the numeral 15, is mounted on said pivot rod, so as to be pivotal with respect to the chassis for unloading purposes, any of the commercial forms of body hoists being employed for causing tilting movement of the body.

The truck body 15 has the usual bottom portion 16, but the sides thereof are of a forwardly stepped formation. The sides 17 of the inner end portion of the body are the highest, while the sides 18 of the intermediate body portion are somewhat lower, and the sides 19 of the rear or outer end portion of the body are the lowest. The result of this arrangement is that the stepped sides of the body define a plurality of compartments designated respectively by the numerals 20, 21 and 22, and said compartments are separated by swinging partitions 23 and 24.

The partitions are shown clearly in Figs. 2 and 3 and each partition is pivotally mounted at its upper end portion on a rod 25, which is eccentrically journaled at its end portions in eccentric bearing brackets 26 carried by the upper edge portions of the body sides. One end portion of each rod has fast thereon an operating lever 27 and when a lever is turned the movement of its rod in its bearing brackets will lift the partition to disengage a hook 28 from a bracket 29. If the truck body is tilted the partitions will hang by gravity in a vertical position and allow material to pass out of the compartments. The end of the rear compartment is closed by an end gate 30 which may be readily opened, or secured in closed position.

The stepped sides and compartments defined thereby are arranged and proportioned so that all of the compartments have the same capacity although they vary as to height and this results in the outer compartment 22 with the low side walls being comparatively long, while the intermediate compartment 21 with the higher walls is somewhat shorter, and the inner compartment 20 with the highest walls is the shortest. Consequently, a large proportion of the load of the material within the truck body is within the forward end portion of the body and the load in the rear end portion of the body is spread out over a considerable surface area. Hence, the concentration of weight in a truck body over the rear wheels, common in the ordinary truck body, is eliminated or greatly reduced in the present truck body, with the result that it will not be unduly damaging to roads and streets and its capacity does not suffer.

From the foregoing description it will be seen that the improved load equalizing truck body is both simple and novel, and is well adapted for the purposes described.

What I claim as my invention is:

1. The combination with a truck frame mounted on front and rear supporting wheels, of a load equalizing body mounted on said truck frame, said body having side walls forwardly stepped as to height, the stepped walls decreasing as to length toward the forward end portion of the body, whereby the greater proportion of a load within said body is distributed toward the front of the body and is materially borne by the front supporting wheels.

2. The combination with a truck frame mounted on front and rear supporting wheels, of a compartmental body mounted on said truck frame and modified from standard practice in that each successive compartment toward the front of the body increases as to height with respect to an immediately rearwardly adjacent compartment, whereby a load within the body is more forwardly disposed than in bodies of standard practice and the rear wheels are relieved of much of the weight thereof.

3. The combination with a truck frame mounted on front and rear supporting wheels, of a body mounted on said truck frame and formed with a plurality of compartments extending in a row from the rear end portion of the body to the front end thereof, each compartment being higher than the next adjacent rearward compartment for distributing a load toward the front portion of the body so that the rear supporting wheels will be somewhat relieved of the load.

4. The combination with a truck frame mounted on front and rear supporting wheels, of a compartmental body mounted on said truck frame and modified from standard practice in that each successive compartment toward the front of the body increases as to height and decreases as to length with respect to an immediately rearwardly adjacent compartment, whereby a load within the body is more forwardly disposed relative to the front supporting wheels than in bodies of standard practice.

5. The combination with a truck frame mounted on front and rear supporting wheels, of a compartmental body mounted on said truck frame and modified from standard practice in that said compartments extend in a row from the rear end portion of the body to the front end portion thereof with each compartment being of a greater height and of a less length than its immediately rearwardly located compartment, whereby a load within the body is more forwardly disposed relative to the front supporting wheels than in bodies of standard practice.

6. The combination with a truck frame mounted on front and rear supporting wheels, of a body mounted on said truck frame and formed with more than two compartments extending in a row from the rear end portion of the body to the front end portion thereof, each successive compartment toward the front of the body being of a greater height and of a less length than its immediately rearwardly adjacent compartment, and all of said compartments being of substantially the same cubic capacity whereby the rear wheels are relieved of a substantial burden of a load within the body.

7. The combination with a truck frame mounted on front and rear supporting wheels, of a tiltable truck body mounted on said frame, said body comprising a bottom portion and opposed forwardly progressively stepped side walls defining a plurality of alined compartments, each successive compartment toward the front of the body increasing as to height and decreasing as to length with respect to its immediately rearwardly adjacent compartment to dispose a larger proportion of a load within the body within the forward portion thereof to be borne by the front wheels, and a plurality of spaced pivotal partitions between said side walls adjacent the steps in the same and separating the compartments.

In testimony whereof, I affix my signature.

CHARLES G. EISENBERG, Jr.